United States Patent [19]

Satake et al.

[11] Patent Number: 5,273,800
[45] Date of Patent: Dec. 28, 1993

[54] OPTICAL RECORDING MEDIUM

[75] Inventors: Toshimi Satake; Tomoaki Nagai; Hiroshi Fukui; Miyuki Yokoyama; Akio Sekine, all of Tokyo, Japan

[73] Assignee: Jujo Paper Co., Ltd., Tokyo

[21] Appl. No.: 902,502

[22] Filed: Jun. 23, 1992

Related U.S. Application Data

[63] Continuation of Ser. No. 516,034, Apr. 27, 1990, abandoned.

[30] Foreign Application Priority Data

Apr. 28, 1989 [JP] Japan ................... 1-110185

[51] Int. Cl.⁵ ............................................... B32B 9/00
[52] U.S. Cl. ......................................... 428/64; 428/65; 428/913; 428/98; 369/288; 346/76 L; 346/135.1; 430/270
[58] Field of Search ................... 430/270; 428/64, 65, 428/913, 98; 369/288; 346/76

[56] References Cited

U.S. PATENT DOCUMENTS 4,581,317 4/1986 Simmons, III ............. 430/270
4,623,896 11/1986 Hausslein .................. 346/1.1

FOREIGN PATENT DOCUMENTS 0289352 2/1988 European Pat. Off. .
94494 6/1983 Japan .
209594 12/1983 Japan .
272702 11/1988 Japan .

OTHER PUBLICATIONS

CA110(25):228044t; Cyanine dye labeling reagents containing isothiocyanate grps. Mujumdar; Ratnakar B, Ernst, Lauren A., Waggoner, Alan S. Cytometry 10(i), 11-19 1989.
CA105(22):200578t; Optical Recording Mat'ls. Nanba Noriyoshi, Asami, Shigeru, Aoi Toshiki, Takahashi Japan Kokai Tokkyo Koho 31 pp. 1986.
CA104(2):13111c, Laser optical recording mat'l Japan Kokai Tokkyo Koho 5 pp.; 1985.
CA100(25):208139t; Effectiveness of various preservatives in the ensilage of fodder crops; Avramenko, P. S.; Postovalova L. M., Shamritskaya; Vests; Akad. Navuk BSSR; 1984.
Patent Abstracts of Japan, vol. 9, No. 282 (M-428) (2005) Nov. 9, 1985, & JP-A-60 124289 (Ricoh K.K.) Jul. 3, 1985, *the whole document*.
Chemical Industry, vol. 37, No. 5, 1986.
Patent Abstracts of Japan, vol. 10, No. 93, p. 445, (2150) Apr. 10, 1986, & JP-A-60 226036 (Mitsui Toatsu Kagaku K.K.) Nov. 11, 1985.
Patent Abstracts of Japan, vol. 10, No. 93, p. 445 (2150), Apr. 10, 1986, & JP-A-60 226035 (Mitsui Toatsu Kagaku K.K.) Nov. 11, 1985.

Primary Examiner—Patrick J. Ryan
Assistant Examiner—Cathy K. Lee
Attorney, Agent, or Firm—Cushman, Darby & Cushman

[57] ABSTRACT

In an optical recording medium fitted on a substrate a recording layer containing a light absorbent which absorbs light having a central wave length in the near infrared region, performs thermal conversion of light energy and emits heat energy, and a heat-sensitive recording material, a high density image can be recorded with a small amount of laser irradiation by using a specific water soluble infrared absorbing compound as a light absorbent.

4 Claims, 1 Drawing Sheet

OPTICAL RECORDING MEDIUM

This is a continuation of application Ser. No. 07/516,034, filed on Apr. 27, 1990, is now abandoned.

BACKGROUND OF THE INVENTION

1) Field of the Invention

The present invention relates to an optical recording medium which carries out recording by irradiating condensed laser beams on a substrate fitted with a recording layer containing a heat-sensitive recording material and a light absorbent which absorbs light having a central wave length in the near infrared region, performs thermal conversion of light energy and emits in the form of heat energy.

2) Description of the Related Art

The heat-sensitive recording system is a direct recording system which does not require development and fixing steps, and is excellent in operation and maintenance. Hence, the system is widely used for facsimiles and printers.

In this system, however, hot recording is conducted by bringing a thermal head or an exothermic IC pen into direct contact with a heat-sensitive recording paper. Consequently, colored substances in a fused state adhere to the thermal head or the exothermic IC pen, cause troubles such as dregs adhesion and sticking, and lead to problems of record obstruction and impairment of record quality.

In particular, when a line is continuously drawn in a recording direction as in the case of a plotter printer, it has been impossible to carry out continuous printing without trouble of dregs adhesion.

Further, in the recording system using the thermal head, it has been considered difficult to heighten an image resolution to 8 dott/mm or more.

Consequently, non-contact recording systems using light have been proposed as techniques for eliminating the troubles of dregs adhesion and sticking and further improving image resolution.

Japanese Patent Laid-Open No. 209594/1983 discloses an optical recording medium prepared by laminating on a substrate at least one set of layer consisting of a near infrared absorbent layer having an absorption wave length in a near infrared region of 0.8 to 2 $\mu$m and a heat-sensitive color-developing material layer. Japanese Patent Laid-Open No. 94494/1983 describes a recording medium obtained by coating a substrate with one or more of heat-sensitive color-developing materials and one or more of near infrared absorbents composed of compounds having a maximum absorption wave length in the near infrared region of 0.7 to 3 $\mu$m.

In these recording media, application of the near infrared absorbent and the heat-sensitive color-developing material to a substrate or a base material is carried out by mixing the near infrared absorbent and the heat-sensitive color-developing material and applying the resulting mixture, or by previously applying a heat-sensitive color-developing material layer on the substrate or the base material and then applying the near infrared absorbent on the layer of the heat-sensitive color-developing material to form a laminated layer.

In these publications, cyanine dyes, thiol nickel complexes and squalium dyes have been disclosed as the near infrared absorbents having absorption wave length in the near infrared region of 0.8 to 2 $\mu$m. Other near infrared absorbents which have been known are nitroso compounds and metal complexes thereof, polymethine dyestuffs (cyanine dyestuffs), cobalt or palladium complexes of thiol, phthalocyanine dyestuffs, triallyl methane dyestuffs, immonium or diimmonium dyestuffs and naphthoquinone dyestuffs. These near infrared absorbents are described in the paper entitled "Near Infrared Absorption Dyestuffs" [Chemical Industry (Japan), 43, May 1986].

Many of the above known near infrared absorbents have been developed for use in a high density memory such as optical discs. These absorbents are laminated on a disc substrate in the form of a uniform membrane and are hence required to dissolve in organic solvents. Consequently, these near infrarred absorbents could not be used by dissolving in an aqueous system.

On the other hand, those of absorbents being dispersed in the aqueous system has been proved to be excellent as a method for constructing the heat-sensitive recording medium in view of safety and mass production.

Accordingly, development of an excellent near infrared absorbent having solubility in water is inevitable for the preparation of an optical recording medium constituting of the heat-sensitive recording material and the near infrared absorbent.

Any of the above conventional near infrared absorbents have absorption in a visible region to a certain extent. As a result, these absorbents are colored and cause problems of exhibiting undesirable color tone when these absorbents are used for the optical recording medium.

SUMMARY OF THE INVENTION

The principal object of the present invention is to provide an optical recording medium having high productivity and safety in handling and developing favorable color tone by using a specific near infrared absorbent which is soluble in an aqueous system.

The above object can be achieved by providing an optical recording medium according to the present invention wherein optical printing is carried out with laser beam irradiation by fitting on a substrate a recording layer containing a specific light absorbent which absorbs light having a central wave length in the near infrared region, performs thermal conversion of light energy and emits heat energy and is soluble in an aqueous system, and a heat-sensitive recording material.

DETAILED DESCRIPTION OF THE INVENTION

Figure 1:
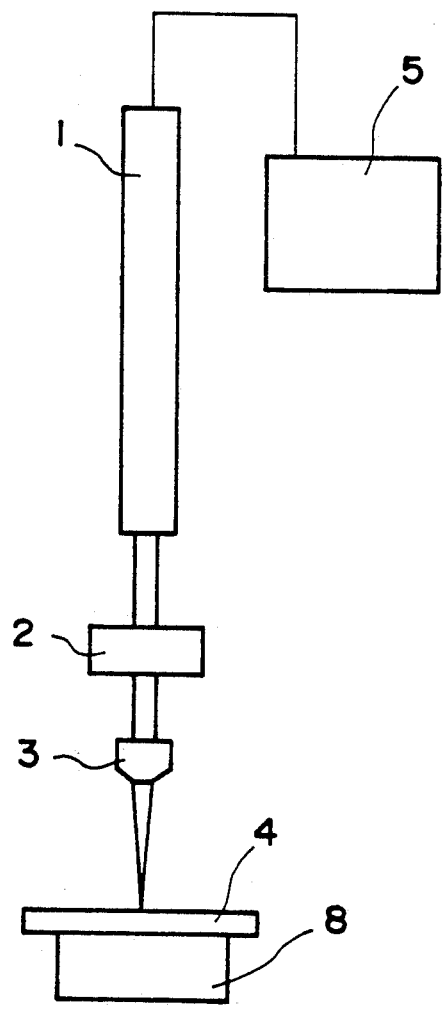
FIG. 1 illustrates a block diagram of a laser optical recording device for use in developing an optical printing by laser beam irradiation on an optical recording medium.

The present invention is characterized in that, in an optical recording medium fitted on a substrate a recording layer containing a light absorbent which absorbs light having a central wave length in the near infrared region, performs thermal conversion of light energy and emits heat energy, and a heat-sensitive recording material, the light absorbent used in a water soluble near infrared absorbing compound represented by the following formula (I):

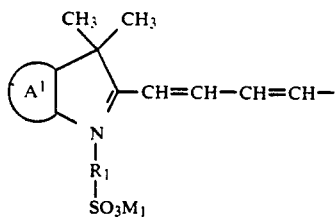

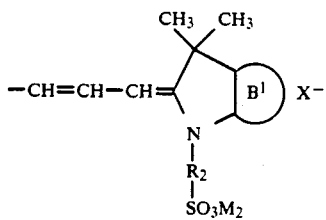

wherein ring $A^1$ and ring $B^1$ are a benzene ring or a naphthalene ring and may have a sulfonic acid group, carboxyl group, hydroxyl group, halogen group and other polar groups; $R_1$ and $R_2$ are an alkyl group or an alkenyl group of from $C_1$ to $C_8$; $X^-$ is an anion; $M_1$ and $M_2$ are a hydrogen atom, Na or K when $X^-$ is present; and either $M_1$ or $M_2$ is a hydrogen atom, Na or K when $X^-$ is absent.

The present invention is particularly characterized in that a substrate is fitted thereon a heat-sensitive color-developing layer containing a basic colorless dye and an organic developer which thermally develops color of said colorless dye, and that a light absorbent containing protective layer consisting of a water soluble binder and the water soluble near infrared absorbing compound of the formula (I) is laminated on said heat-sensitive color-developing layer.

The present invention is further characterized in that the laser beam reflectance of near infrared region on the recording surface of the optical recording medium is from 15 to 70%, and the near infrared absorbing compound is used in an amount of 0.05 to 10% by weight per weight of the solid in the water soluble binder of the protective layer.

The near infrared absorbing compound used for the invention and represented by the formula (I) is a light blue powder which is soluble in water and has a high absorption in the near infrared region.

Exemplary compounds of the formula (I) which are suitable for use in the invention include following compounds.

| Compound No. | Chemical structure |
| --- | --- |
| 1 | |
| 2 | |
| 3 | |
| 4 | |

| Compound No. | Chemical structure |
|---|---|
| 5 | Benz[e]indolenine-based trimethine cyanine dimer with two C(CH₃)₂ bridging groups, two N⁺−(CH₂)₃SO₃Na substituents, −(CH=CH)₃CH= polymethine chain, ClO₄⁻ counterion |
| 6 | Indolenine-based cyanine with two C(CH₃)₂ groups; one N⁺−(CH₂)₃SO₃⁻ and one N−(CH₂)₃SO₃Na; −(CH=CH)₃CH= chain |
| 7 | Indolenine-based cyanine with two C(CH₃)₂ groups; one N⁺−(CH₂)₃SO₃⁻ and one N−(CH₂)₃SO₃K; −(CH=CH)₃CH= chain |
| 8 | Indolenine-based cyanine with two C(CH₃)₂ groups; both N−(CH₂)₃SO₃Na (one N⁺); I⁻ counterion; −(CH=CH)₃CH= chain |
| 9 | Benz[e]indolenine cyanine with two C(CH₃)₂ groups; both N−(CH₂)₃SO₃K (one N⁺); I⁻ counterion; −(CH=CH)₃CH= chain |
| 10 | Indolenine cyanine with two C(CH₃)₂ groups; both N−(CH₂)₄SO₃Na (one N⁺); I⁻ counterion; −(CH=CH)₃CH= chain |
| 11 | Benz[e]indolenine cyanine with two C(CH₃)₂ groups; one N⁺−(CH₂)₄SO₃Na and one N−(CH₂)₄SO₃⁻; −(CH=CH)₃CH= chain |
| 12 | Indolenine cyanine with two C(CH₃)₂ groups; one N⁺−(CH₂)₄SO₃K and one N−(CH₂)₄SO₃⁻; −(CH=CH)₃CH= chain |

-continued

| Compound No. | Chemical structure |
|---|---|
| 13 | [structure: bis-benz[e]indolium pentamethine cyanine with gem-dimethyl, N-(CH₂)₄SO₃Na groups, I⁻ counterion] |
| 14 | [structure: bis-benz[e]indolium pentamethine cyanine with gem-dimethyl, N-(CH₂)₄SO₃Na groups, ClO₄⁻ counterion] |
| 15 | [structure: bis(5-hydroxy-3,3-dimethylindolium) pentamethine cyanine, N-CH₂SO₃Na groups, I⁻ counterion] |
| 16 | [structure: bis(hydroxy-benz[e]indolium) pentamethine cyanine, N-(CH₂)₄SO₃Na / (CH₂)₄SO₃⁻ groups (inner salt)] |
| 17 | [structure: bis(hydroxy-benz[e]indolium) pentamethine cyanine, N-(CH₂)₄SO₃Na groups, ClO₄⁻ counterion] |
| 18 | [structure: bis(NaSO₃-benz[e]indolium) pentamethine cyanine, N-(CH₂)₄SO₃Na groups, ClO₄⁻ counterion] |
| 19 | [structure: bis(NaSO₃-indolium) pentamethine cyanine, N-(CH₂)₃SO₃Na and N-(CH₂)₂SO₃Na groups, I⁻ counterion] |

On the other hand, no particular restriction is imposed upon the heat-sensitive recording material, that is, the heat-sensitive color-developing material so long as the material thermally develops color. The so-called dye base heat-sensitive color-developing material containing color-developing components consisting of a colorless or light colored electron donating dye and an organic developer which colors said dye is preferable in view of obtaining various distinct colors with low energy and being capable of increasing the whiteness of recording surface.

Known techniques on the heat-sensitive recording medium composed of these heat-sensitive color-developing materials can be applied in the present invention.

In the heat-sensitive color-developing layer, a binder, sensitizer, filler and a quality regulator are used in addition to the electron donating colorless dye and the organic developer.

Representative examples of these additives will be illustrated hereinafter.

Typical examples of the electron donating colorless dyes include triphenylmethane base leuco dyes such as crystal violet lactone, fluoran base leuco dyes such as 3-diethylamino-6-methyl-7-anilinofluoran, azaphthalide base leuco dyes such as 3-(4-diethylamino-2-ethoxyphenyl)-3-(1-ethyl-2-methylindol-3-yl) -4-azaphthalide and fluorene base leuco dyes such as 3,6,6'-tris(dimethylamino)spiro[fluorene-9,3'-phthalide].

Exemplary organic developers include bisphenol-A's, 4-hydroxybenzoic acid esters, 4-hydroxyphthalic acid diesters, phthalic acid monoesters, bis-(hydroxyphenyl) sulfides, 4-hydroxyphenylaryl sulfones, 4-hydroxyphenylaryl sulfonates, 1,3-di[2-(hydroxyphenyl)-2-propyl]benzenes, 4-hydroxybenzoyloxybenzoic acid ester and bisphenol sulfones.

Suitable binders are, for example, modified polyvinyl alcohols such as fully saponified polyvinyl alcohol having polymerization degree of 200 to 1900 and amide modified polyvinyl alcohol; hydroxyethylcellulose; and styrenebutadiene copolymer.

Aliphatic amide and montan wax may usually be used as a sensitizer or a quality regulator. Clay, calcium carbonate, plastic pigments and other fillers which are generally used in the paper processing field may be added. In particular, a hollow plastic pigment is preferred because of excellent reflection of near infrared light and good retention of heat.

Kinds and amounts of the organic developer, electron donating colorless dye, binder, sensitizer, filler and other various components used in the color-developing layer of the present invention are dependent upon a required performance and recording properties, and not affected by particular restriction. However, it is usually desirable that 3 to 12 parts (hereinafter part means part by weight of solid component) of the organic developer, 3 to 12 parts of the sensitizer and 1 to 20 parts of the filler are used per part of the electron donating colorless dye, and 10 to 25 parts of the binder is used in the total solid component of the color developing layer.

The organic developer, electron donating colorless dye and the sensitizer are pulverized separately, or in combination with other necessary materials when no adverse effect is observed, to a particle size of several microns or less by using a grinding machine or a dispersing machine such as a ball mill, attritor and a sand grinder. Then the binder and the above mentioned various quality regulators are added depending upon the object to obtain a coating liquid.

The coating liquid thus obtained is applied on the substrate or the optical recording layer to constitute the heat-sensitive color-developing layer.

It is preferred to provide a protective layer for diminishing or preventing environmental contamination such as moisture, gases, water, solvents and oily materials.

The above protective layer must be permeable to visible light and give no adverse effect on the heat-sensitive color-developing layer. Usually, one or more binders are selected from those used for the heat-sensitive color-developing layer and employed for the protective layer.

The near infrared absorbent having the formula (I) in the invention may be used as a component of the light absorbing heat-sensitive color-developing layer by mixing with the heat-sensitive color-developing material or used as a light absorbing layer above and/or below the heat-sensitive color-developing layer composed of the heat-sensitive color-developing material.

In order to incorporate the near infrared absorbent of the formula (I) with the heat-sensitive color-developing material, the absorbent may merely be mixed with the necessary materials. However, the absorbent is more favorably used as a dispersion obtained by previously melt-mixing the absorbent with the sensitizer or the organic developer.

It is particularly preferred that the protective layer mounted on the heat-sensitive color-developing layer contains the near infrared absorbent and has light absorbing function.

The protective layer is applied on the heat-sensitive color-developing layer in an amount of 1 to 10 g/m$^2$. The near infrared absorbent is added in an amount of 0.05% by weight or more per weight of the high molecular binder used in the protective layer. The amount of less than 0.05% cannot provide sufficient heat. No particular restriction is imposed upon the maximum amount of the absorbent. However, the amount of 10% by weight or less is usually sufficient in view of color development resulting from the near infrared absorbent, necessary quantity of heat and economy.

The substrates of the optical recording medium in the present invention are papers, clothes, non-woven fabrics and films.

The light source necessary for the optical recording of the invention is a semi-conductor laser, diode pumping YAG laser, Xe flash lamp, quarz flash lamp and a halogen lamp. The light source can be used so long as the light contains wave length of 700 to 2500 nm in the near infrared region, and selected depending upon the object for use.

In particular, the most preferred light source for the recording is the semiconductor laser having a central wave length of 750 to 850 nm and oscillating with an output of 20 mW or more.

It is thought that, when the optical recording medium of the invention is irradiated with light having a central wave length in the infrared region, the irradiated light is absorbed in the water soluble near infrared absorbent of the present invention, light energy is effectively converted to heat energy and the heat energy is emitted. The heat thus generated successively melts the sensitizer, developer and the dye to perform color development.

EXAMPLE

The present invention will hereinafter be illustrated by way of examples. Part in the examples means part by weight.

EXAMPLE 1

[Formation of color developing layer]

| Liquid (A) (Dye dispersion) | |
|---|---|
| 3-Diethylamino-6-methyl-7-anilinofluoran (ODB) | 2.0 parts |
| 10% Aqueous polyvinyl alcohol solution | 3.4 parts |
| Water | 1.3 parts |
| Total | 6.7 parts |
| Liquid (B) (Color developer dispersion) | |
| Bisphenol A (BPA) | 6.0 parts |
| p-Benzylbiphenyl | 4.0 parts |
| 10% Aqueous polyvinyl alcohol solution | 12.5 parts |
| Water | 2.5 parts |
| Total | 25.0 parts |

Liquid (A) and Liquid (B) were separately wet ground by an testing sand grinder for an hour according to the above composition, respectively.

In the next step, a coating liquid for heat-sensitive color-developing layer was prepared by mixing 6.7 parts of Liquid (A) (Dye dispersion), 25 parts of Liquid (B) (Color developer dispersion), 11.76 parts of 42.5% hollow pigment dispersion Roh-peic OP-481 (made by Rohm & Haas Co., Ltd.) and 10 parts of 10% aqueous polyvinyl alcohol solution.

The coating liquid thus obtained was applied on a wood free paper having a basis weight of 60 g/m$^2$ in an amount of 4.0 g/m$^2$ by using a meyer bar, followed by drying to obtain an optical recording paper.

[Formation of light absorbing protective layer]

| Near infrared absorbent (Compound No. 13) | 0.5 part |
|---|---|
| 10% Aqueous polyvinyl alcohol solution | 100 parts |
| Glyoxal (40%) | 5 parts |
| Total | 105.5 parts |

The above obtained coating liquid for the light absorbing protective layer was applied on the recording medium obtained above in an amount of 2.0 g/m$^2$ by using a meyer bar and dried to obtain an optical recording paper having a protective layer.

EXAMPLES 2 AND 3

The same procedures as described in Example 1 were carried out except that the amount of the near infrared absorbent, compound No. 13, was changed from 0.5 part to 0.25 part and 0.7 part, respectively. Thus, light recording papers having a protective layer were obtained.

EXAMPLES 4 AND 5

Optical recording papers having a protective layer were prepared by carrying out the same procedures as described in Example 1 except that electron donating colorless dyes S-205 and ODB-2 were used, respectively, in place of the electron donating colorless dye ODB.

S-205: 3-(N-Ethyl-N-isoamylamino)-6-methyl-7-anilinofluoran

ODB-2: Dibutylamino-6-methyl-7-anilinofluoran

EXAMPLES 6 AND 7

Optical recording papers having a protective layer were prepared by carrying out the same procedures as described in Example 1 except that organic developers BPS and POB were used, respectively, in place of the organic developer BPA.

BPA : Bisphenol A
BPS : Bisphenol S
POB : p-Hydroxybenzoic acid benzyl ester

EXAMPLES 8 AND 9

Optical recording papers having a protective layer were obtained by carrying out the same procedures as described in Example 1 except that the water soluble near infrared absorbents of compound No. 11 and No. 15 were added to the protective layer, respectively, in place of the near infrared absorbent of compound No. 13.

COMPARATIVE EXAMPLE 1

An optical recording paper having a protective layer was obtained by carrying out the same procedures as described in Example 1 except that the protective layer on the heat-sensitive color-developing layer and fitted without addition of the near infrared absorbent.

COMPARATIVE EXAMPLES 2, 3 AND 4

Optical recording papers were prepared by carrying out the same procedures as described in Example 1 except that the near infrared absorbents which were outside the scope of the present invention, that is, NK-1161 and NK-123 (Both are made by Nippon Kankoshikiso Co., Ltd.: Maximum absorption wave length is 817 μm and 927 μm, respectively), and PA-1006 (made by Mitsui Toatsu Chemicals Inc.: Maximum absorption wave length is 870 μm) were added to the protective layer, respectively, in place of the near infrared absorbing compound No. 13.

COMPARATIVE EXAMPLE 5

An optical recording paper was obtained by carrying out the same procedures as described in Example 1 except that copper sulfate which was outside of the scope of the present invention was dispersed in the protective layer as the near infrared absorbent.

Each of the optical recording paper obtained in the above examples and comparative examples were respectively irradiated with laser beams by using a semiconductor laser device shown in FIG. 1 (Laser diode collimeter head LDC-8330-CINC: made by Applied Optic. Co., Ltd.: central wave length 830 nm, output 30 mW). The laser beams were condensed by passing through a condenser (MDPLAN 5, 0.1: made by Olympus Optical Co., Ltd.) to carry out optical printing at a transfer rate of 1.5 mm/sec by using a rotating stage.

In FIG. 1, 1 is laser diode collimeter head, 2 is shutter, 3 is condenser group, 4 is optical recording paper, 5 is power source, and 8 is rotating stage.

The optical recording medium obtained by the above examples and comparative examples were evaluated on the developed color density of the recorded image and the ground color by the following methods. The results are illustrated in Table 1.

Density of the Recorded Image

Density was measured with a microdensitometer (made by Konishiroku Photo Industry Co., Ltd.; Model PDM-6). Measured value was converted to Macbeth density. Ground color:

Blank portion on the paper was measured with a Macbeth desitometer.

TABLE 1

| | Heat-sensitive material | | Near infrared absorbent | | | Evaluation | | |
|---|---|---|---|---|---|---|---|---|
| | Dye | Developer | Kind | Added* amount (part) | Average particle size (μ) | Recording surface reflectance (830 nm) (%) | Color density | Ground color |
| Example | | | | | | | | |
| 1 | ODB | BPA | No. 13 | 5 | — | 45 | 1.35 | 0.10 |
| 2 | PDB | BPA | " | 2.5 | — | 58 | 1.32 | 0.18 |
| 3 | ODB | BPA | " | 7 | — | 35 | 1.40 | 0.14 |
| 4 | S-205 | BPA | " | 5 | — | 45 | 1.36 | 0.10 |
| 5 | ODB-2 | BPA | " | 5 | — | 56 | 1.34 | 0.09 |
| 6 | ODB | BPS | " | 5 | — | 45 | 1.35 | 0.10 |
| 7 | ODB | POB | " | 5 | — | 44 | 1.35 | 0.10 |
| 8 | ODB | BPA | No. 11 | 5 | — | 45 | 1.32 | 0.12 |
| 9 | ODB | BPA | No. 5 | 5 | — | 45 | 1.31 | 0.13 |
| Comparative Example | | | | | | | | |
| 1 | ODB | BPA | — | — | | 95 | 0.06 | 0.06 |
| 2 | ODB | BPA | NK-1161 | 5 | >50 | 75 | 0.56 | 0.12 |
| 3 | ODB | BPA | NK-123 | 5 | >50 | 65 | 0.66 | 0.23 |
| 4 | ODB | BPA | PA-1006 | 5 | >50 | 59 | 0.15 | 0.15 |
| 5 | ODB | BPA | Copper sulfate (dissolved) | 5 | | 65 | 0.42 | 0.30 |

Note:
*Added amount per 100 parts of solid resin in the protective layer.

As clearly seen in Table 1, when the water soluble near infrared absorbents used in Examples of the present invention are added to the protective layer, white ground color could be obtained and a black clear image could also be obtained in the dynamic recording of the semicondcutor laser.

On the other hand, the optical recording medium of Comparative Example 1 where the heat-sensitive color-developing layer is applied without addition of the near infrared absorbent could not develop color at all. In Comparative Examples 2, 3 and 4 using the near infrared absorbents which are outside of the invention, no solubility was observed in the aqueous binder, uniformly recorded surface could not be obtained and a continuous and sufficient density of color could not be developed by irradiating the laser beams. Further, water soluble inorganic compounds such as copper sulfate leads to insufficient light absorption, low color density and adverse effect on the heat-sensitive recording layer due to acidic pH of the protective layer under highly humid conditions.

As mentioned above, the optical recording medium containing the specific water soluble near infrared absorbent of the present invention can directly provide a high density image by using a small amount of the absorbent and by irradiating a low output of the near infrared light such as the semiconductor laser. Additionally, the near infrared absorbent used in the present invention can provide an optical recording medium having an excellent blue white appearance due to a small amount of the absorbent used and the essential tone of the near infrared absorbing dye.

Consequently, the present invention can effectively utilize a low output semiconductor laser having the near infrared wave length as a light source by using a specific water soluble near infrared absorbent and is effective for the actual development of a heat-mode optical recording medium.

What is claimed is:

1. A visible optical recording medium fitted on at least one substrate selected from the group consisting of papers, clothes, non-woven fabrics and films a recording layer containing a light absorbent which absorbs light having a central wave length in the near infrared region, performs thermal conversion of light energy and emits heat energy, and a heat-sensitive recording material, characterized in that (i) the light absorbent is a water soluble near infrared absorbing compound represented by the formula (I):

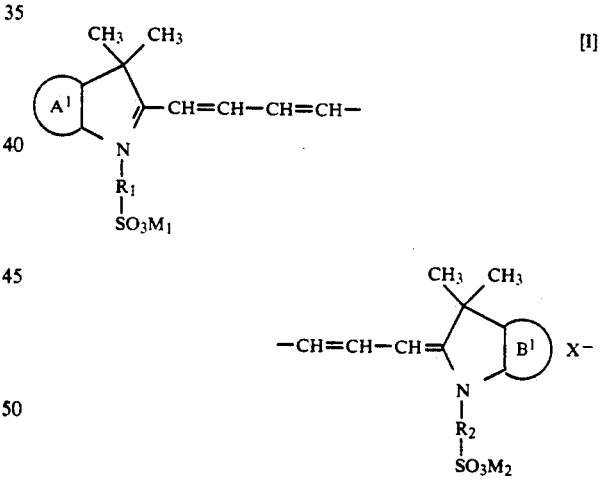

wherein ring $A^1$ and ring B are a benzene ring or a naphthalene ring and may have a polar group including a sulfonic acid group, carboxyl group, hydroxyl group and a halogen group; $R_1$ and $R_2$ are an alkylene group or an alkenylene group of from $C_1$ to $C_8$; $X^-$ is an anion; $M_1$ and $M_2$ are a hydrogen atom, Na or K when $X^-$ is present; and either $M_1$ or $M_2$ is a hydrogen atom, Na or K when $X^-$ is absent and (ii) the heat sensitive recording material contains a basic colorless leuco dye and a phenolic organic developer.

2. The visible optical recording medium of claim 1 wherein the recording layer is formed by laminating a light absorbent protective layer composed of the near infrared absorbing compound of the formula (I) and a water soluble binder on the heat-sensitive color-developing layer composed of the heat-sensitive recording material containing a basic colorless leuci dye and the phenolic organic developer.

3. The visible optical recording medium as claimed in claims 1 or 2 wherein the surface of the recording layer has a reflectance of from 15 to 70% to a near infrared laser beam.

4. The optical recording medium of claim 2 or 3 wherein the near infrared absorbing compound of the formula (I) is used in an amount of from 0.05 to 10% by weight per weight of a solid component in the water soluble binder of the protective layer.

* * * * *